Patented Apr. 6, 1937

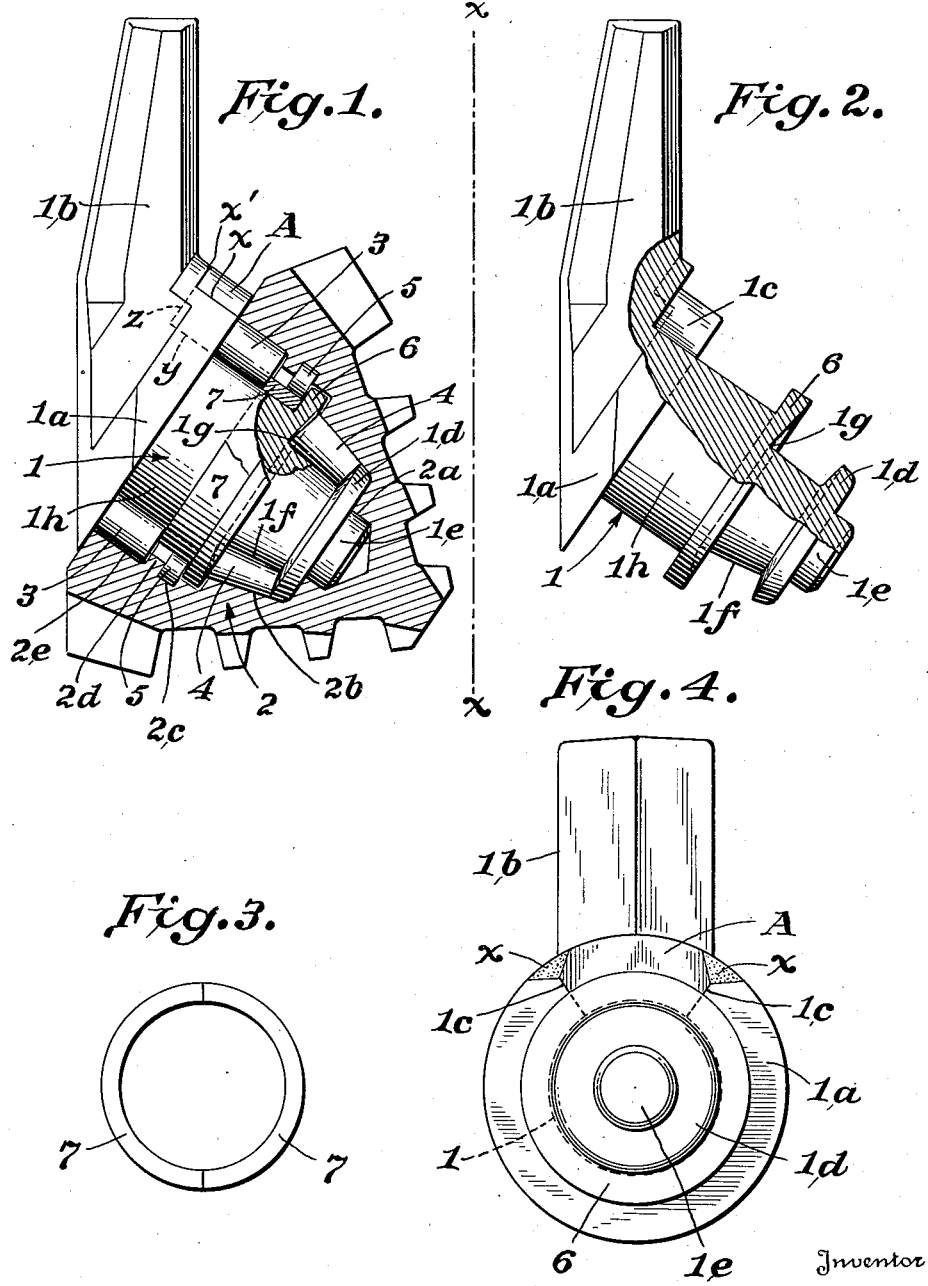

2,076,003

UNITED STATES PATENT OFFICE 2,076,003

EARTH BORING DRILL

Clarence E. Reed, Wichita, Kans., assignor to Chicago Pneumatic Tool Company, New York, N. Y., a corporation of New Jersey Application November 29, 1935, Serial No. 52,272

4 Claims. (Cl. 255—71)

This invention relates to a roller cutter assembly for earth boring drills having anti-friction bearings between the toothed rotary cutter and the spindle, and the invention consists in the features and combination and arrangement of parts hereinafter described and particularly pointed out in the claims.

In the accompanying drawing which illustrates the invention

Figure 1 shows the rotary toothed cutter in longitudinal section with the spindle partly in section, and with some parts of the anti-friction elements in elevation.

Fig. 2 is a view of the spindle partly in elevation and partly in section.

Fig. 3 is a side view of a split ring forming a part of the anti-friction assembly.

Fig. 4 is an end view of the spindle.

In the drawing *I* indicates the spindle; *Ia* the base plate; *Ib* the shank for attachment of the assembled unit to a bit head; *Ic* indicates the sides of an opening in the base plate for insertion of the rollers *3* and the elements *5* into the open end bore of the cutter and into operating position; A is the segment of the base plate for closing the opening *Ic*. The spindle has flanges *Id* and *6* integral therewith. A reduced diameter free end *Ie* forms a friction bearing surface. A tapered raceway is shown, *If*, and a shoulder on the spindle at *Ig*. The main cylindrical portion of the spindle is indicated at *Ih*. The frusto conical roller cutter is indicated by *2*; cylindrical roller bearings by *3*; tapered roller bearings by *4*; locking elements in the form of short rollers by *5*; and a sectional filler ring member by *7*. The cutter *2* has an exterior toothed surface and a bore opening through the base face and terminating within the cutter; *2a* is a friction bearing surface in the bore of the cutter; *2b* is the bearing surface in the bore of the cutter for tapered bearings *4*; *2c* is a groove in the bore of the cutter for reception of the locking elements *5*; *2d* is a flange like rib integral with the cutter and forming one side wall of the groove; *2e* is a bearing surface for the roller bearings *3* in the base of the cutter.

At A is shown a segment of the base plate *Ia*, which is formed as a separate piece, insertable into place in the recess *Ic* of the main portion of said base plate after the assembly of the various parts has been completed. This segment of the base plate is welded to the main portion of the plate at *x*. After being secured in place, the surface of the base plate, together with that of the segment, is machined to remove the excess welding material, and to true up the peripheral surface of the base plate and its welded segment, so that the unit will fit accurately a seat recess in the bit head.

In assembling the parts of the rotary cutter unit, the parts of the sectional ring *7* are placed in position about the cylindrical portion of the one piece spindle adjacent the face of the base plate *Ia*; that is to say, at a zone of said spindle most remote from the integral flange *6* thereof.

The tapered bearings *4* are then placed in position in the raceway with the smaller ends against the flange *Id* and the larger ends abutting the shoulder *Ig* and flange *6*. The rotary cutter *2* is placed in its operating position, enclosing the spindle, tapered roller bearings and ring *7*. Then, through the segmental opening or gateway *Ic* in the base plate *Ia*, which now exists by reason of the fact that the segment A has not been assembled as yet, the locking elements *5* are introduced into the raceway of the rollers *3* past the filler ring *7* and on into a position against flange *6* and moved radially outwardly into the groove *2c*. After the locking elements *5* are all in position in the groove, the sectional ring *7* is moved towards the free end of the spindle and fills the space between the locking elements *5* and the cylindrical portion of the spindle. The space between the cutter flange *2d* and the cylindrical portion of the spindle is slightly wider than the diameter or width of the locking elements *5*, hence the locking elements *5* may be readily passed into operating position in the groove. The purpose of these elements *5* is to lock the cutter rotatively on the spindle. Elements *5* are not intended to sustain radial loads of the cutter. Thrusts of the cutter *2* towards the drill axis are resisted by the flange *2d* contacting the flat sides or ends of elements *5*, which elements contact the integral flange *6* transmitting thereto the thrusts imposed in a direction towards the vertical axis of the drill. The flange *Id* is an integral portion of the spindle. To complete the assembly the rollers *3* are introduced through the segmental opening in the base plate *Ia* into the raceway in the base of the cutter and bear on the cylindrical portion *Ih* of the spindle, and the bearing surface *2e* of the cutter. The segmental opening in the base plate is then filled by the segmental section A which is welded in place at *x*.

It is well known that in operation the thrusts of the cutter are mainly and predominantly towards the support, *Ia*, outwardly from the drill axis of rotation; hence the cutter tends to move outwardly and its end thrust is sustained by the flange *Id* and the tapered bearings and the shoulder *Ig*, and thus the radial rollers *3* are not subjected to end thrusts of the cutter, therefore the segmental recess *Ic* in the base plate requires no consideration from an operating standpoint—it has no function in the operation of the cutter, or the assembled parts. It will also be noted there is clearance between the inner ends of the rollers 3 and the cutter flange 2d. The rollers 3 may contact the sectional ring 7, although a small clearance is present, and the ring 7 may move very slightly longitudinally of the spindle. Sectional ring 7 is merely a filler member to hold the elements 5 in the groove, and does not sustain operating loads of the cutter. The integral flange 6 is also formed with small clearances all round. The rollers 3 prevent any displacement of the filler ring member 7 in operation. The flange 6 does not receive radial loads of the cutter but does sustain end thrusts from locking elements 5; that is to say, when the cutter is under pressure towards the vertical axis of rotation of the drill, the rollers 5 move axially through the small clearance on that side and against the side of the flange.

The complementary frictional bearings at the free end of the spindle and the cutter bore serve to maintain the axial alignment of the cutter on the spindle and rolling bearings.

The axis of drill rotation is indicated by the dotted line $x-x$. The spindle axis inclines downwardly and inwardly towards the axis of rotation of the drill. The cutter has two cutting zones on its toothed periphery, the base zone dominating the rolling motion of the cutter. The teeth on the apex portion of the cutter are spaced widely apart, the spacing at tooth crest being wider than the tooth edge. A plurality of cutter units are used in each complete drill assembly, hence each cutter unit has less duty to perform than otherwise. The spindle with its several flanges and bearing portions is formed in one piece and all parts associated therewith are held together by surface to surface contact with each other and with the parts of the spindle without resort to screw threads or other means of connection, said assembly thereby being adapted to sustain thrusts and stresses imposed thereon during the drilling operation.

It will be noted from Fig. 4 that the gateway $1c$ extends from the periphery of the base ring $1a$ to the line of the periphery of the spindle and the bottom of this gateway conforms in curvature to the projected periphery of the spindle. The rollers 3 when placed on the bottom of this recess will be directly in line with the cylindrical surface of the spindle ready to be moved into the open base bore of the rotary cutter, and onto the cylindrical raceway surface of the spindle on which said rollers 3 are intended to run. All parts of the gateway recess are located radially outward beyond the projected cylindrical surface of the spindle. The spindle is left of its full diameter throughout its cylindrical bearing portion.

Because of the fact that the gate piece is located at the point shown and described, the welding may be limited in degree to that only necessary to hold the gate in place while handling the unit prior to its assembly into the bit head. When this assembly has been accomplished the gate will be held in place by the wall of the recess in the bit head in which the base plate of the unit is seated, said gate being located in said base plate, and being covered, in the assembled organization, by the ceiling of said recess, protected from frictional wear of the earth formation. Hence as above stated, the weld may be of the smallest possible degree, and instead of being made at the points indicated in Fig. 4, it may be made at the point $x'$ in Fig. 1. In any event, a mere spot welding will be sufficient, and this may be applied without detriment to the bearings.

I claim:

1. A spindle and support for a roller cutter assembly of an earth boring drill having a raceway surface on the spindle adjacent the support for anti-friction bearings, a gateway in the support extending in a plane at right angles to the axis of the spindle, said gate opening in a direction radial to the axis of the spindle and communicating with said raceway and a gate member to close said gateway, substantially as described.

2. A spindle and support for a roller cutter of an earth boring drill consisting of a spindle portion having a raceway for anti-friction members, a shank portion for attachment to a drill head, said shank portion extending at an angle to the spindle portion, and a gateway extending radially outward relative to the spindle axis and located at a zone between the spindle portion and the shank, and a member for closing said gateway, substantially as described.

3. In combination, a spindle and support connected together, said support having a surface at its junction with the spindle in a plane at right angles to the axis of the spindle, said spindle having a cylindrical surface providing a raceway for anti-friction rolling bearings adjacent the first mentioned surface, a roller cutter having a bore receiving the spindle, anti-friction rolling bearings between the peripheral raceway of the spindle and the wall of the cutter bore, said bore being open at the base face of the cutter which lies adjacent the surface first mentioned, said support having a gateway directly adjacent the base face of the cutter, which gateway opens in a direction radially outward from the spindle axis and communicates with the said open bore of the cutter, and a member closing said gateway, substantially as described.

4. In combination, a spindle having a cylindrical portion the surface of which provides a raceway for anti-friction bearings, a reduced diameter tapered extension providing a shoulder between itself and said cylindrical portion, a flange at the small end of the tapered extension integral therewith, a flange integral with the spindle, one side face of which is in line with the face of said shoulder, tapered roller bearings on said tapered spindle portion bearing at their larger ends upon said shoulder and bearing at their smaller ends upon the other flange, a toothed roller cutter on the spindle having a raceway surface for the tapered roller bearings, rolling bearings between the wall of the cutter bore at the base thereof and said cylindrical portion of the spindle, locking rolling bearings bearing on that integral flange of the spindle which is located adjacent the spindle shoulder, said roller cutter having a groove in the wall of its bore receiving said locking rolling bearings and a split ring holding the locking rolling bearings in place, said anti-friction rolling bearings being introduced into the base bore of the cutter after the cutter has been placed on the spindle, and a spindle support having a gateway for the introduction of said anti-friction rolling bearings, and means for closing said gateway, substantially as described.

CLARENCE E. REED.